(No Model.)
L. Z. GRIGSBY.
COMBINED COTTON CHOPPER AND CULTIVATOR.
No. 310,416. Patented Jan. 6, 1885.
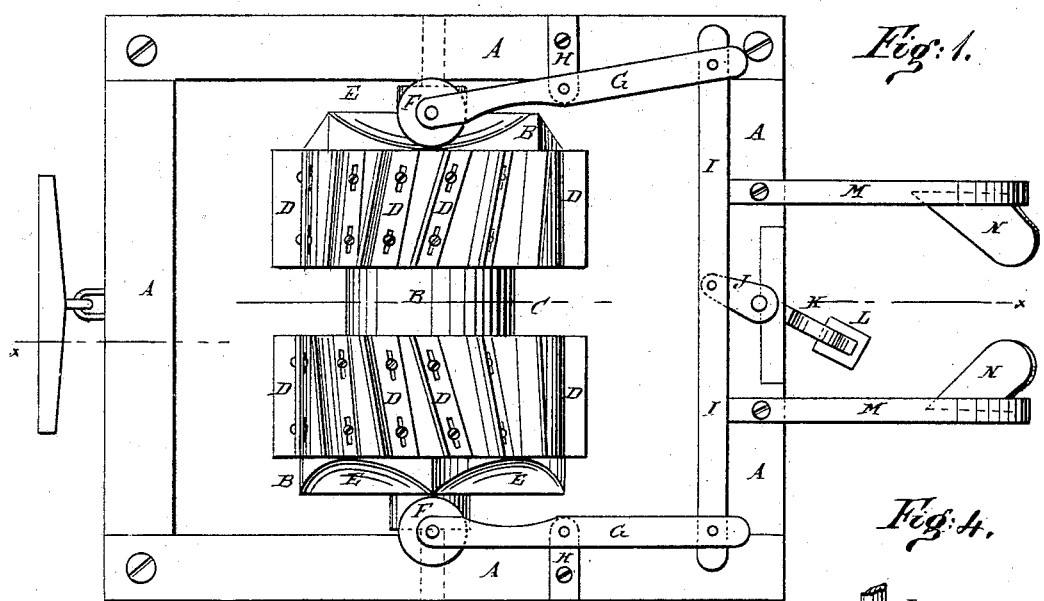
Fig: 1.
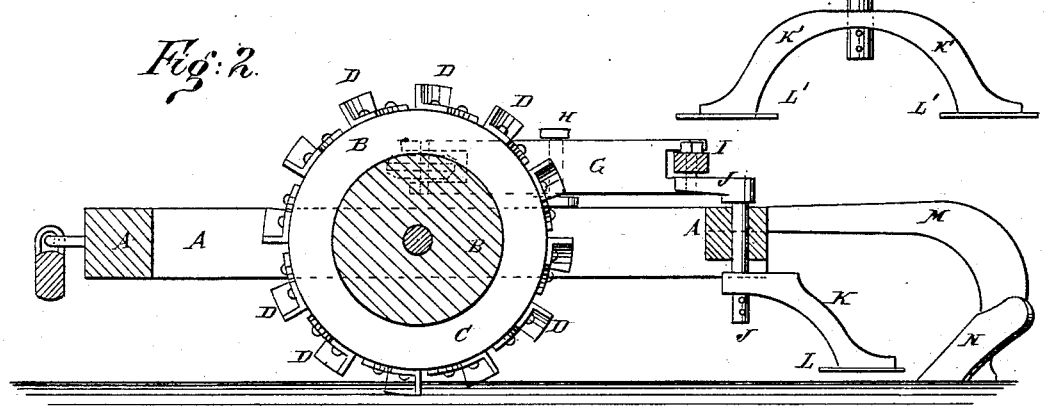
Fig: 2. Fig: 4.
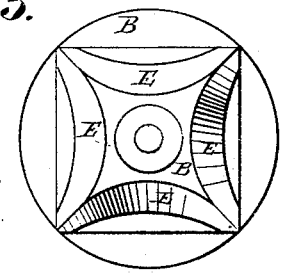
Fig: 3.
WITNESSES:
Chas. Nida
C. Sedgwick
INVENTOR:
L. Z. Grigsby
BY Munn & Co.
ATTORNEYS.

UNITED STATES PATENT OFFICE.

LEMUEL ZACHEUS GRIGSBY, OF MINDEN, LOUISIANA.

COMBINED COTTON CHOPPER AND CULTIVATOR.

SPECIFICATION forming part of Letters Patent No. 310,416, dated January 6, 1885.

Application filed June 11, 1884. (No model.)

*To all whom it may concern:*

Be it known that I, LEMUEL ZACHEUS GRIGSBY, of Minden, in the parish of Webster and State of Louisiana, have invented certain new and useful Improvements in Combined Cotton Choppers and Cultivators, of which the following is a full, clear, and exact description.

Reference is to be had to the accompanying drawings, forming part of this specification, in which similar letters of reference indicate corresponding parts in all the figures.

Figure 1 is a plan view of my improved machine. Fig. 2 is a sectional side elevation of the same, taken through the line $x$ $x$, Fig. 1. Fig. 3 is an end elevation of the cylinder. Fig. 4 is a side elevation of a double chopping-hoe.

The object of this invention is to facilitate the chopping and cultivating of cotton and other plants planted in drills or rows and requiring to be brought to a stand.

The invention consists in a combined cotton chopper and cultivator constructed with a frame, a cylinder having a central annular groove, and provided with adjustable knives upon its face and cam-concaves in its ends, operating levers connected at their rear ends by a cross-bar pivoted to a crank carrying the chopping-hoe and its standard, whereby the stalks, vines, roots, weeds, and grass at the sides of the plants will be cut in pieces, the soil mellowed, and the plants chopped to a stand by the passage of the machine along the row. To the rear cross-bar of the machine-frame are attached plow-beams provided with plows, so that the plants will be dirted after being chopped to a stand, as will be hereinafter fully described.

A represents the frame of the machine, in bearings in the middle parts of the side bars of which revolve the journals of the cylinder B.

Around the center of the cylinder B is an annular groove, C, of sufficient width and depth to receive the plants and prevent them from being injured as the machine is drawn along the row of plants.

To the face of the cylinder B are attached laterally-inclined knives D, which, as the machine is drawn along the row, cut in pieces old stalks, roots, vines, grass, and weeds that may be along the sides of the row of plants, and mellow the soil along the said sides, so that the plants to be left for a stand will not be knocked out of the ground by the action of the chopping-hoe, hereinafter described. The knives D can be made with flanges along their backs, provided with slots to receive the fastening-screws, so that the said knives can be adjusted to cause their inner ends to work at any desired closeness to the plants; or the knives can be constructed and secured to the cylinder in any suitable manner.

In each end of the cylinder B are formed four (more or less) concaves, E, to serve as cams for operating the chopping-hoe. The cam-concaves of the two ends of the cylinder alternate with each other, so that the bottom of a concave at one end will be opposite the adjacent ends of two concaves at the other end, as shown in Fig. 1.

Against the concaved ends of the cylinder B rest small wheels F, pivoted to the ends of levers G, which are pivoted to supports H, attached to the side bars of the frame A. The rear ends of the levers G are pivoted to the opposite ends of a cross-bar, I, the center of which is pivoted to a crank, J. The shaft of the crank J is pivoted to bearings attached to the center of the rear cross-bar of the frame A, and to its lower end is attached the standard K, which is curved rearward and downward, and to its lower end is attached the chopping-hoe L. Both the side edges of the hoe L project, so that the said hoe will operate when moving toward either side of the machine. By this construction the levers G will be held parallel with each other, and will be vibrated by the concaves E as the machine is drawn forward, vibrating the cross-bar I, and operating the crank J to swing the hoe from side to side, the forward motion of the machine causing the said hoe to follow a zigzag path, passing from one side of the row of plants to the other, and cutting out the plants as it crosses the row, and thus chops the plants to a stand.

If desired, the standard K′ can be made double, or in the form of an arch attached at its center to the lower end of the shaft of the crank J, and having a hoe, L′, at each end, as shown in Fig. 4. In this case the double standard K′ should be made of such a length with reference to the circumference of the cylinder that at each movement of the crank J the rear hoe, L', will cross the row of plants at the point where the forward hoe crossed at the preceding movement.

To the rear cross-bar of the frame A, upon the opposite sides of and equally distant from the crank J, are rigidly attached the forward ends of two plow-beams, M, the rear parts of which are curved downward, and have plows N attached to their ends to throw soil around the plants, so that the row of plants will be chopped to a stand and dirted at one passage of the machine along the said row.

Having thus described my invention, what I claim as new, and desire to secure by Letters Patent, is—

1. A combined cotton chopper and cultivator constructed substantially as herein shown and described, and consisting of the frame A, the grooved cylinder B, having knives D on its face and cam-concaves E in its ends, the wheels, levers, and cross-bar F G I, and the crank J, standard K, and hoe L, as set forth.

2. The combination, with the frame A, of the cylinder B, having central annular groove, C, and the adjustable knives D, substantially as herein shown and described, whereby the stalks, roots, vines, weeds, and grass at the sides of the row will be cut in pieces and the soil mellowed, as set forth.

3. The combination, with the frame A and the cylinder B, having central annular groove, C, and cam-concaves E in its ends, of the wheels F, the levers G, the cross-bar I, and the crank J, carrying the standard K, and the chopping-hoe L, substantially as herein shown and described, whereby the said hoe will be operated by the advance of the machine, as set forth.

4. In a cotton-chopper, the frame A, the cylinder B, having the central annular groove, C, and the knives D, the chopping-hoe L, and the plow-beams M, carrying the plows N, in combination, substantially as and for the purpose set forth.

LEMUEL ZACHEUS GRIGSBY.

Witnesses:
 J. W. BERRY,
 W. J. BOON.